(12) United States Patent
Work et al.

(10) Patent No.: US 8,779,625 B2
(45) Date of Patent: Jul. 15, 2014

(54) ADAPTIVE SOLAR POWERED SYSTEM

(75) Inventors: Jason N. Work, Victoria (CA); Neil D. Wyper, Okotoks (CA); Simon H. Lightbody, Victoria (CA)

(73) Assignee: Carmanah Technologies Corp., Victoria (CA)

( * ) Notice: Subject to any disclaimer, the term of this patent is extended or adjusted under 35 U.S.C. 154(b) by 438 days.

(21) Appl. No.: 13/161,220

(22) Filed: Jun. 15, 2011

(65) Prior Publication Data

US 2011/0242802 A1    Oct. 6, 2011

Related U.S. Application Data

(62) Division of application No. 11/278,916, filed on Apr. 6, 2006.

(51) Int. Cl.
*H02J 1/12* (2006.01)
*H02J 3/32* (2006.01)
*H02J 3/34* (2006.01)

(52) U.S. Cl.
USPC .......................................................... 307/46

(58) Field of Classification Search
USPC ...................................................... 307/46, 80
See application file for complete search history.

(56) References Cited

U.S. PATENT DOCUMENTS

| | | | |
|---|---|---|---|
| 4,636,931 A | 1/1987 | Takahashi et al. |
| 5,233,287 A | 8/1993 | Lenk |
| 5,327,071 A | 7/1994 | Frederick et al. |
| 5,359,280 A | 10/1994 | Canter et al. |
| 5,477,132 A | 12/1995 | Canter et al. |
| 5,569,998 A | 10/1996 | Cowan |
| 5,623,398 A | 4/1997 | Beach et al. |
| 5,839,816 A | 11/1998 | Varga et al. |
| 6,031,359 A | 2/2000 | Michelsen et al. |
| 6,081,104 A | 6/2000 | Kern |
| 6,104,624 A | 8/2000 | Iwamoto et al. |
| 6,255,804 B1 | 7/2001 | Herniter et al. |
| 6,262,558 B1 | 7/2001 | Weinberg |

(Continued)

FOREIGN PATENT DOCUMENTS

| | | |
|---|---|---|
| JP | 11243650 | 9/1999 |
| JP | 2004064885 | 2/2004 |

(Continued)

OTHER PUBLICATIONS

Shakya, B.D., et al. "Technical feasibility and financial analysis of Hybrid wind-photovoltaic system with hydrogen storage for Cooma" International Journal of Hydrogen Energy vol. 30, Issue 1, Jan. 2005.
Rahman, H., "A Study on the Performance of Grid-Connected PV-ECS System Considering Meteorological Variation" 15th PSCC, Liege, Aug. 22-26, 2005.
Masoum et al. "Design, Simulation and Implementation of a Fuzzy-Based MPP Tracker Under Variable Insolation and Temperature Conditions" Iranian Journal of Science and Technology, Transaction B, Engineering, vol. 29, No. B1.

*Primary Examiner* — Carlos Amaya
(74) *Attorney, Agent, or Firm* — Smiths IP (57) ABSTRACT

An apparatus for powering a load from solar energy comprises logic is coupled to the converter to control its conversion rate. A detector is coupled to the converter and detects its power output. The logic is operable to adjust the conversion rate until the solar panel operates at the smaller of a maximum power point of the solar panel and a power point of the solar panel that results in a maximum desired power and second logic adjusts the energy consumption over a period of time as a function of the energy available from the solar panel over a previous same period of time.

8 Claims, 7 Drawing Sheets

(56) References Cited

U.S. PATENT DOCUMENTS

| | | |
|---|---|---|
| 6,346,670 B1 | 2/2002 | Fujii et al. |
| 6,396,167 B1 | 5/2002 | Simburger et al. |
| 6,433,522 B1 | 8/2002 | Siri |
| 6,573,659 B2 | 6/2003 | Toma et al. |
| 6,617,831 B2 | 9/2003 | Perol |
| 6,768,047 B2 * | 7/2004 | Chang et al. ............... 136/244 |
| 6,914,418 B2 | 7/2005 | Sung |
| 2004/0211459 A1 | 10/2004 | Suenaga et al. |
| 2004/0232898 A1 | 11/2004 | Morris et al. |
| 2005/0162144 A1 | 7/2005 | Kernahan |
| 2005/0270175 A1 * | 12/2005 | Peddie et al. ............... 340/907 |
| 2006/0030990 A1 | 2/2006 | Anderson et al. |

FOREIGN PATENT DOCUMENTS

| | | |
|---|---|---|
| WO | 96/20369 A1 | 7/1996 |
| WO | 00/74200 A1 | 5/2000 |
| WO | 01/13038 A1 | 2/2001 |
| WO | 2004/047272 | 6/2004 |

* cited by examiner

ADAPTIVE SOLAR POWERED SYSTEM

RELATED APPLICATIONS

This application is a divisional of U.S. patent application Ser. No. 11/278,916 filed Apr. 6, 2006.

FIELD OF THE INVENTION

This invention relates to solar power systems and in particular to power management subsystems for solar power systems.

BACKGROUND OF THE INVENTION

Solar powered systems provide benefits such as reduced installation cost, the ability to be installed in areas where no other source of energy is available, etc. Typically, a solar powered system will consist of a solar panel, battery, load (such as a light emitting diode) and associated circuitry. The associated circuitry controls charging of the battery, load operating times and load operating levels.

Sizing of the solar panel or panels, battery or batteries for a given installation requires many inputs for optimal cost for a given performance requirement. For instance, the latitude and weather conditions in a given installation location significantly affect the amount of power available to the system. In addition, if the location of installation can be shaded by buildings, trees, etc., it may be desirable to reduce the load levels, load operating times, increase the size of the solar panel, increase the size of the battery, etc. in order for continued operation of the device.

Solar powered systems may be used in many different applications. These applications include marine beacons, aviation beacons, roadway signals, transit shelter lighting systems, roadway signs, etc. Some applications have known operating times which may be taken into account during the design of the system. Other applications have operating times that are determined by the user of the system. When the operating times are determined by the user, design of the system becomes more difficult because the amount of energy used by the system over a given time period may be unknown at the time of design or installation of the system.

A solar power lighting system may have to be designed to provide adequate energy to the lights during the winter when the amount of solar insolation may be reduced. This may be more of a consideration for latitudes farther from the equator as day length is reduced by a greater amount during the winter than at latitudes closer to the equator. Typically a combination of sizing the solar panel to provide enough energy in the winter months and sizing the battery to carry adequate energy through the shortest days of the year is used to ensure adequate lighting. For lighting systems designed to provide light primarily during the night, the effect of shorter days with less solar insolation is compounded by the fact that the nights are longer in the winter. Thus, the lighting system requires more energy. The solar panels and batteries are often sized for sustained winter operation; therefore during the summer months, an excess amount of energy is available from the solar panels and/or batteries which typically cannot be utilized.

In some solar powered lighting applications, it may be desirable to control the lighting based on the time of day. Since solar powered lighting is often installed in areas where access to communications infrastructure is limited, maintaining the time of day using conventional means such as through wired or wireless communications may be difficult.

SUMMARY OF THE INVENTION

The invention comprises elements of a solar power system and methods of operating the system. The system may be used for powering loads such as light emitting diodes (LEDs), audio systems, communications systems, etc. The system is capable of making maximum use of available solar power while continuing operation when available solar power is reduced. In an alternative implementation, the system is capable of operation with smaller componentry when traditionally there would be too much solar insolation and system components would be damaged. The system may be capable of determining the time of day by detecting when the beginning and end of a day or night occurs. An alternative implementation of the system may be coupleable to an electric grid.

The solar powered system may come in various versions. These versions may include solar powered crosswalk beacons, solar powered school zone warning beacons, solar powered traffic warning signals, solar powered bus shelters, solar powered advertising panels, solar powered street name signs, solar powered audio warning signals, or various other versions where powering a load from solar power is advantageous.

In one aspect, the invention comprises an apparatus for powering a load from solar energy comprising a DC/DC converter, battery terminals coupled to an output of the converter and coupleable to an energy storage device, solar panel terminals coupled to an input of the converter and coupleable to a solar panels, and logic coupled to the converter to control the conversion rate of the converter. A detector is coupled to the converter to detect the power output of the converter. Logic is operable to adjust the conversion rate until the solar panel operates at the smaller of a maximum power point of the solar panel and a power point of the solar panel that results in a maximum desired power.

In another aspect, the invention comprises apparatus for powering a load from solar energy comprising a DC/DC converter, battery terminals coupled to the converter and coupleable to a battery and solar panel terminals coupled to the converter and coupleable to a solar panel. First logic is provided for controlling a conversion rate of the converter to operate near the maximum power point of the solar panel. A detector detects an energy output of the converter and second logic is coupled with the detector to adjust the energy consumption of the load over a period of time as a function of the energy available from the solar panel over that period of time.

In yet another aspect, the invention comprises a method of determining a time to deliver an amount of energy to a load in a solar powered system comprising monitoring an output of a solar panel to determine a start of day, monitoring the output of the solar panel to determine a start of night, rejecting an effect in said determination of said start of day caused by artificial light, using the beginning of the night and the beginning of the day to compute the current time of day and delivering said amount of energy to the load based on the current time of day.

BRIEF DESCRIPTION OF THE DRAWINGS

The invention will be described by reference to following detailed description and to the drawings thereof in which.

DETAILED DESCRIPTION

Figure 1:
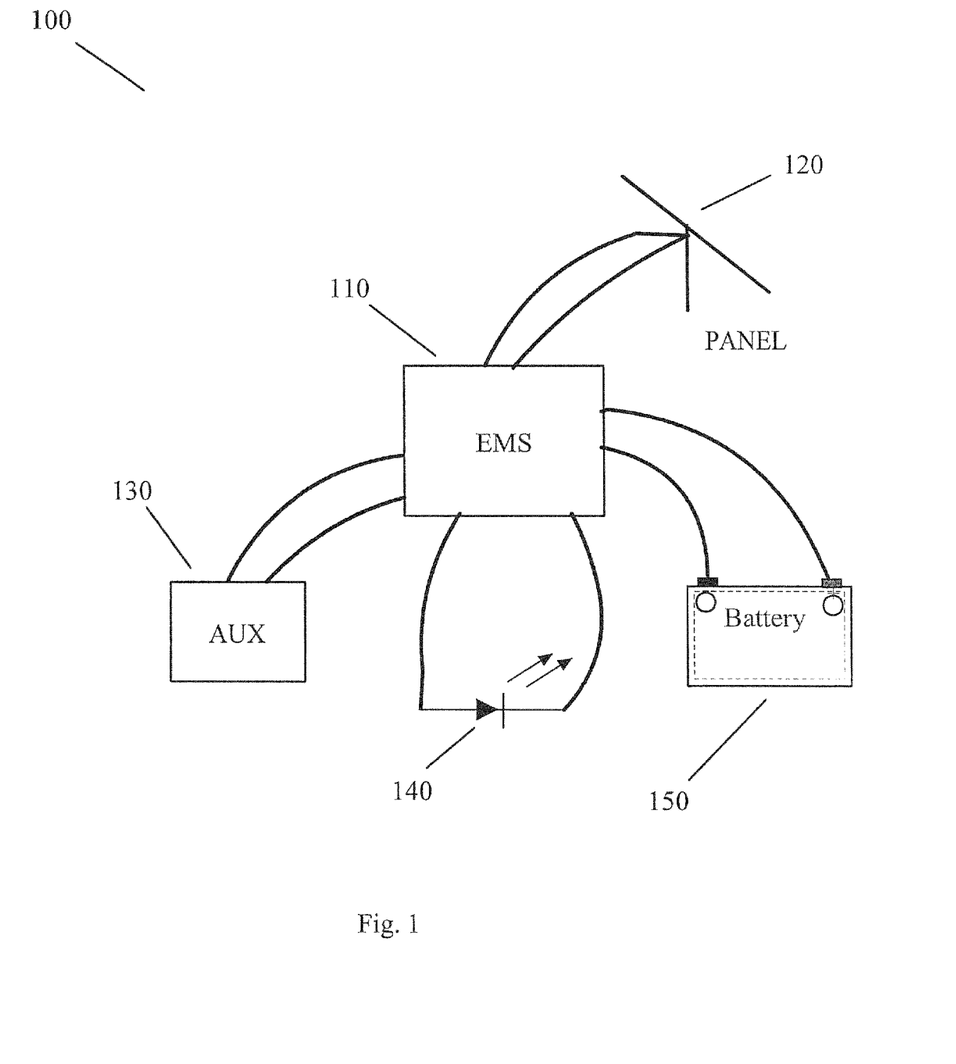
FIG. 1 is a diagram of the system of an example of the invention.

FIG. 1 is a diagram of solar powered system 100. The solar powered system comprises an energy management system (EMS) 110. The EMS 110 is coupled to a solar panel 120 for receipt of energy from the sun. The EMS 110 is coupled to a battery 150 for storage of energy. Alternatively, another energy storage device such as a supercapacitor, fuel cell, etc. may be used. The EMS 110 is coupled to a load 140 (such as an LED or LEDs) to which the EMS may provide power. Auxiliary circuitry 130 may use power from the EMS 110 or provide or receive other signals from the energy management system 110. Auxiliary circuitry may comprise for example a pedestrian pushbutton, motion detector, etc.

Figure 2:
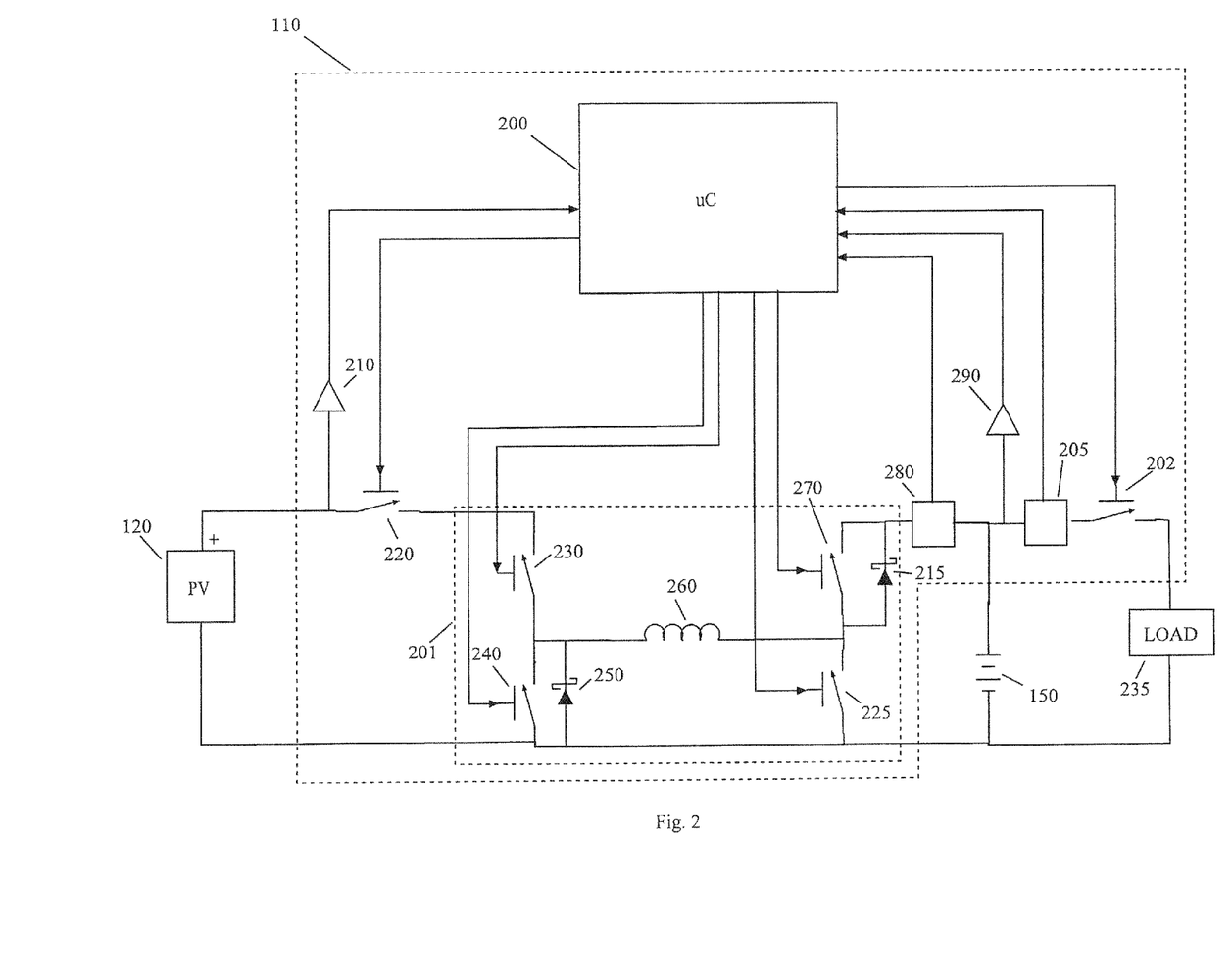
FIG. 2 is a schematic of the componentry implementing an example of the invention.

FIG. 2 is a schematic diagram of an example implementation of the EMS 110. In this figure, standard support circuitry known to be necessary in the field has been omitted for clarity. A processor 200 controls the operation of the EMS 110. The processor may comprise a microcontroller, microprocessor or any applicable logic capable of carrying out the functions described herein. The processor 200 receives a signal indicative of the voltage of solar panel 120 through photovoltaic voltage sensing circuitry 210. This may for example enter an A/D input of the processor 200. This voltage may be the open circuit voltage of the solar panel 120 when switch 220 is open or the operating voltage of the solar panel 120 when switch 220 is closed. DC/DC converter 201 receives power from the solar panel 120 and provides it to the battery (or batteries) 150 and/or the load 235. The processor 200 can control the application of power to the load 235 using switch/control circuitry 202. Switch/control circuitry 202 may be a simple switch or more complex circuitry capable of controlling the amount of voltage, current or power delivered to the load 235.

DC/DC converter output current sensing circuitry 280 detects the amount of current flowing from the DC/DC converter 201 and provides a signal indicative thereof to processor 200. Load current sensing circuitry 205 detects the amount of current flowing to the load 235 and provides a signal indicative thereof to the processor 200. Battery voltage sensing circuitry 290 detects the battery 150 voltage and provides a signal indicative thereof to the processor 200.

The DC/DC converter 201 receives power from the solar panel (or panels) 120 and provides this power to supply load 235 and/or charge battery 150. The DC/DC converter is disposed in H-bridge configuration. Alternatively, any other applicable DC/DC converter topology may be used. The DC/DC converter may operate in three different modes. The first mode (buck) may used when the solar panel 120 voltage is higher than the battery 150 voltage. The second mode (boost) may be used when the solar panel 120 voltage is lower than the battery 150 voltage. The third mode (buck/boost) may be used when the solar panel 120 voltage is higher or lower than the battery 150 voltage.

In buck mode, switch 270 is always on, while switch 225 is always off. Switch 230 is controlled via a Pulse-Width Modulated (PWM) drive signal from processor 200. The duty cycle of the PWM signal of switch 230 determines the ratio of the input and output voltage of the DC/DC converter 201: Vout=Vin*d. Switch 240 can optionally be used to provide synchronous rectification by turning on when Switch 230 is off and visa versa. Synchronous rectification improves the efficiency of the converter by reducing the voltage drop across schottky diode 250 during the time when switch 230 is not conducting.

In boost mode, switch 230 is always on and switch 240 is always off. In this configuration, switch 270 is controlled via a PWM drive signal from processor 200, and switch 225 provides the optional synchronous rectification by turning on when switch 270 is off and visa-versa. This improves efficiency by reducing the voltage drop across schottky diode 215. Again, the duty cycle of the PWM signal determines the ratio of the input and output voltages: Vout=Vin/(1−d).

In buck/boost mode, all four switches are driven simultaneously, in pairs. Switch 230 and switch 225 are driven in phase with each other, and switch 240 and switch 270 are driven in phase with each other. When the 230/225 pair is turned on, the 240/270 pair is turned off. The duty cycle of the 230/225 pair determines the ratio of input and output voltages, which can vary over a wide range. This mode of operation may be less efficient than the pure Buck, or pure Boost modes, but is operable whether the output voltage is higher or lower than the input voltage.

Since the output voltage of the DC/DC converter 201 is the battery 150 terminal voltage, which changes relatively slowly, the DC/DC converter can be used to control the input voltage which is the solar panel 120 voltage. By varying the duty cycle appropriately (depending on the mode of operation), the solar panel 120 can be adjusted until the power delivered to the battery 150 reaches any desired point on the solar panel voltage/current characteristic.

The switches 220, 225, 230, 240, 270 and 202 may be MOSFETs configured with appropriate drive circuitry or another type of electronic switch appropriate for a given implementation.

Figure 3:
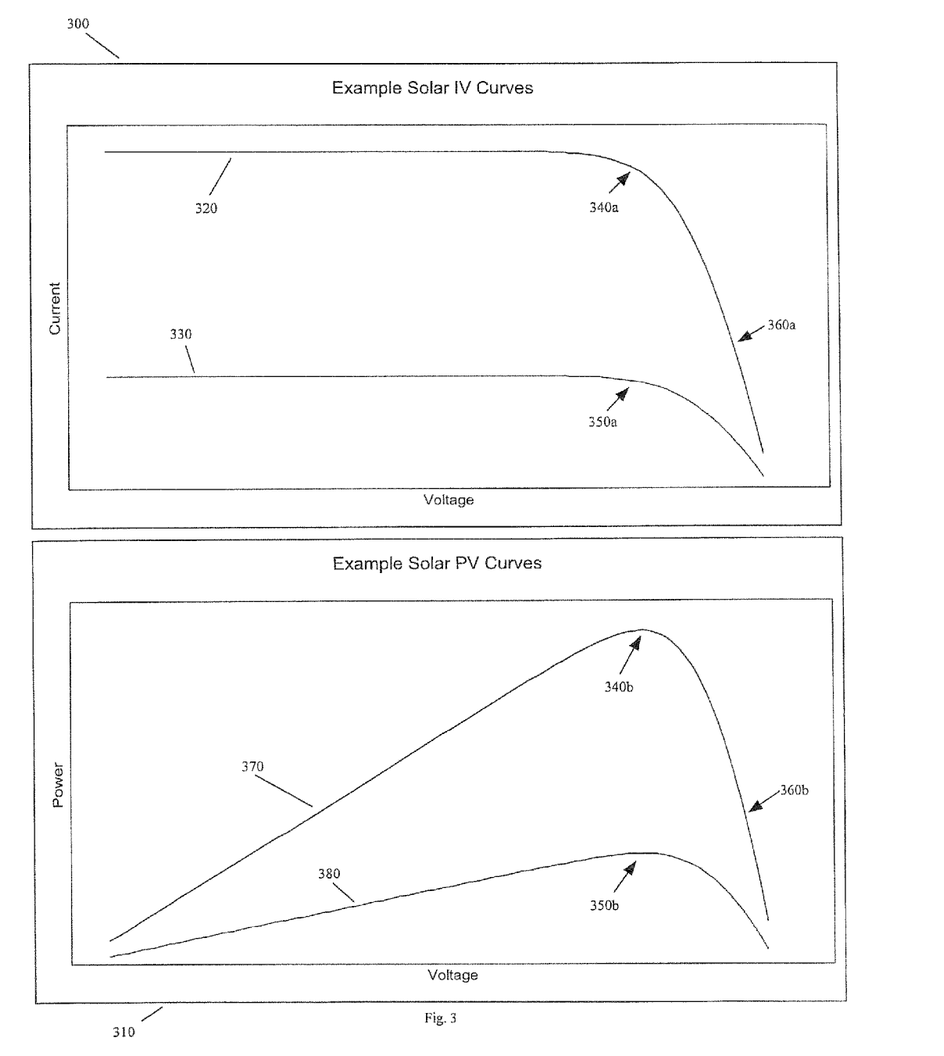
FIG. 3 is a set of solar panel current-voltage and power voltage curves that may be applied with an example of the invention.

FIG. 3 depicts characteristic curves for a solar panel 120. Characteristic panel current-voltage (IV) curves 300 show the current output of the solar panel 120 for a given voltage. Summer IV curve 320 shows what the IV curve of solar panel 120 may look like when available power is high during a summer day. Winter IV curve 330 shows what the IV curve of solar panel 120 may look like when available power is lower during a winter day, the solar panel 120 is in the shade, etc.

Characteristic panel power-voltage (PV) curves 310 show the power output available from solar panel 120 for a given voltage. Summer PV curve 370 shows what the PV curve of solar panel 120 may look like when available power is high during a summer day. Winter PV curve 380 shows what the PV curve of solar panel 120 may look like when available power is lower during a winter day, the solar panel 120 is in the shade, etc.

The maximum power point in summer is represented by point 340a and 340b. The maximum power point in winter is represented by point 350a and 350b. The processor 200 can adjust the DC/DC converter 201 to operate at or near these maximum power points.

Alternatively, it may be desirable to not operate the solar panel 120 at its maximum power point during certain times of the year. It may be desirable to operate the solar panel 120 at points 360a and 360b in the summer due to the fact that less current will be flowing through the DC/DC converter 201 and therefore the current carrying capacity of switches 220, 225, 230, 240, inductor 260, schottky diodes 215 and 250, wiring, circuit board traces, etc. may be reduced with a corresponding reduction in the size and cost of these devices. This mode of operation is desirable because it is often necessary to size the solar panel 120 and battery 150 to provide enough energy to operate the load during operation of the system in the winter. Therefore, the solar panel 120 may have excess output during the summer and the battery 150 may not have adequate capacity to store the excess energy the solar panel 120 generates. This may be especially true the farther in latitude the system is installed from the equator and/or in geographic locations where cloudy weather is more prevalent at certain times of the year.

Figure 4:
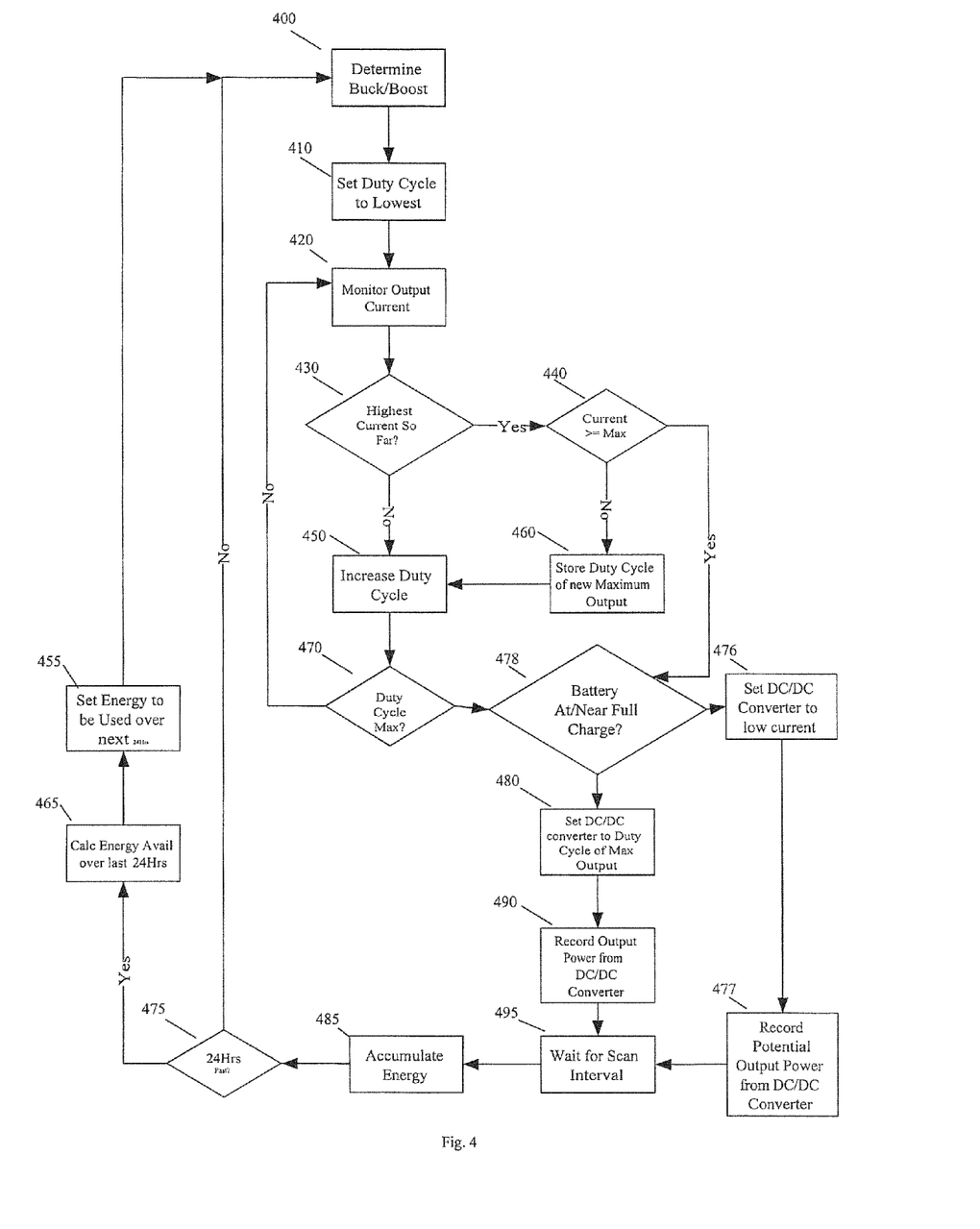
FIG. 4 is a flowchart for the a portion of the operation of a processor according to an example of the invention.

FIG. 4 is a flowchart of the operation of processor 200 to control DC/DC converter 201. First, the processor 200 determines which mode to operate the DC/DC converter in (block 400). This may be done in several ways such as measuring the open circuit voltage of the panel and estimating whether the solar panel 120 voltage of the desired power point will be above or below the battery 150 voltage. Alternatively, the buck/boost mode may be used initially until the operating voltage of the solar panel 120 stabilizes at a voltage above or below the battery voltage.

Next, the processor 200 sets the PWM duty cycle to the switches appropriate for the selected mode to a minimum (block 410). This may be for instance a duty cycle of 1/64 for a 100 kHz PWM signal. This makes the solar panel 120 operate very near to its open circuit voltage. The current flowing from the DC/DC converter 201 is monitored (block 420). The current flowing is compared to the maximum current recorded during the current operating loop (block 430). If the present current is not the maximum recorded during this operating loop, the duty cycle is increased (block 450). If the present current is the maximum recorded during this operating loop, the present current is compared to the maximum current allowed due to the circuit design (block 440). If the present current is greater than the maximum current allowed, execution continues at block 478 (described below). If the present current is not greater than the maximum current allowed, the duty cycle and current of the present setting are recorded as the new maximum and execution continues at block 450. At block 470, the duty cycle is increased and execution continues at block 420 until the maximum duty cycle has been tried. Alternatively other techniques such as looking at the rate of change of current may be used to find the maximum.

Once the maximum duty cycle has been tried, if the battery is at or near full charge (block 478), the DC/DC converter is set to a duty cycle resulting in a low current output to maintain the battery charge (block 476). A record of the potential output power from the DC/DC converter is stored (block 477). This low current may be slightly higher than the present current being drawn by the load.

If the battery is not at or near full charge, the processor begins outputting the duty cycle of the detected maximum power point or maximum current point (block 480). A record of the current output power from the DC/DC converter is stored (block 490).

The processor then operates the PWM outputs at the present setting for a given period of time (block 495). This period of time may be for example 5 minutes. During this time, the processor may monitor the current flowing from the DC/DC converter 201 and restart the process if the current changes by a significant amount. Using the record of the output power, the processor 200 then accumulates the amount of energy output from the DC/DC converter (block 485). If 24 hours have not passed, execution continues at block 400.

If 24 hours have passed, the processor has then accumulated an indication of how much energy was generated, could have been generated, or a combination thereof from the solar panel 120 through the DC/DC converter 201 over the previous day (block 465). Power records from block 490 are indicative of power actually generated whereas power records from block 477 are indicative of power potentially generated that could not be stored due to the battery being near full charge. This information may then be used to set the allowable amount of energy to be used over the next day (block 455). This may be calculated such that the amount of energy to be used is a large fraction of that generated (for example 90%) to take into account inefficiencies in the system and operate the system in an energy balance so that the battery is not depleted over the long term. It will be appreciated that using 24 hours as a fundamental period of time in the above discussion is arbitrary and any appropriate period of time may be used depending on the application. When there is no solar insolation for an extended period of time, the processor 200 may enter a sleep mode by turning off switches 202, 225, 230, 240, 270. This may allow the load to be operated for very short periods of time, during critical times, not at all, etc. while reducing the extraction of energy from the battery 150 to the lowest level possible. Once solar insolation is detected again, the processor 200 may exit this low power mode. This sleep mode may be used when a device incorporating the invention is in a shipping container, in storage, etc., with the battery 150 connected, but no solar insolation available. Thus, the device is ready to operate as soon as solar insolation is detected, but it the device may be left without solar insolation for a relatively long period of time before the battery is completely discharged and potentially damaged.

The amount of energy to use over the next day may be computed using various methods using the amount of energy available over a preceeding number of days. For example:

$$Etouse = \sum \left( \frac{1}{2} E_{today} + \frac{1}{4} E_{yesterday} + \frac{1}{8} E_{two\_days\_ago} \right)$$

where Etouse is the amount of energy to use today, $E_n$ is the amount of energy available on day n.

The number of days to include in the calculation and the fraction to attribute to each day may be determined by the consistency of insolation at the installation location or any other appropriate technique. In general, any adaptive, averaging or smoothing function may be utilized to produce a similar result.

The amount of energy to be used over a day can be adjusted using one or more of several techniques including:

Reducing or increasing the brightness of a light such a an LED by increasing or decreasing the amount of current flowing through the LED or by pulsing the current through the LED for an reduced or increased amount of time at a rate higher than perceptible by the human eye (such as 100 Hz). For example using 90% duty cycle at 100 Hz when a first amount of energy is available and using 50% duty cycle at 100 Hz when a second amount of energy is available.

Changing the pulse shape of the current being driven through the load 140 such that the peak current remains relatively constant while the average current is reduced or increased Reducing or increasing the pulse rate of current through a light such as an LED at a rate that is perceptible to the human eye. In a traffic light application this may for example be changing from 0.5 s on/0.5 s off to 0.4 s on/0.6 s off to reduce overall power consumption. This also may provide a visual indication of the status of the system.

Reducing or increasing the rate at which an audio message is repeated. For example, a warning message may be output every 10 seconds when a first amount of energy is available and every 20 seconds when a second amount of energy is available.

Reducing or increasing the number of lights such as LEDs that are illuminated by the EMS 110.

Reducing or increasing the amount of time lights such as LEDs are illuminated during the night. For example the lights may be turned on for four hours after dusk and 2 hours before dawn when a first amount of energy is available. Alternatively, the lights may be turned on all night when a second amount of energy is available.

Figure 5:
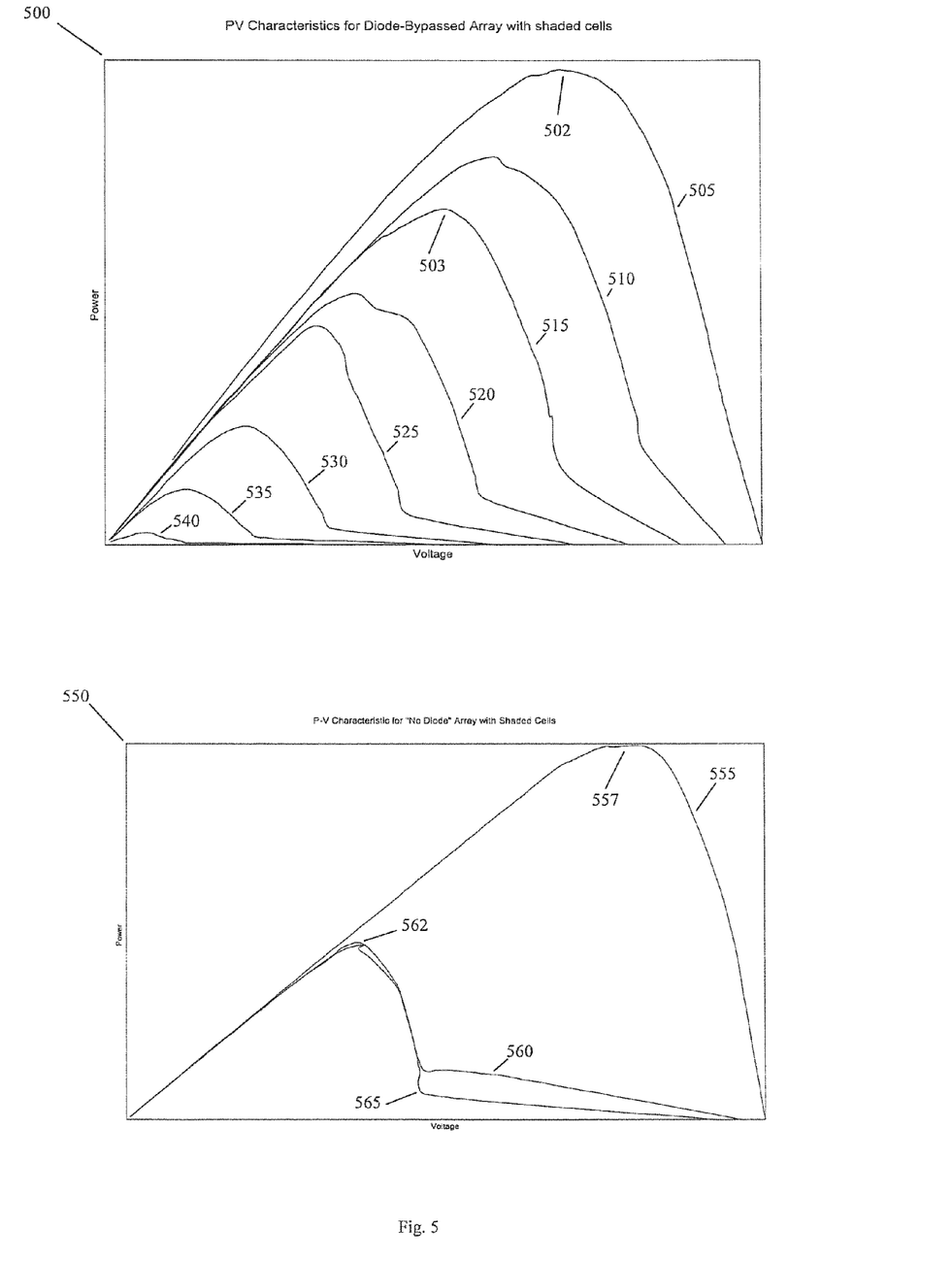
FIG. 5 is a set of solar panel power-voltage plots with or without diode bypassing that may be applied with an example of the invention.

FIG. 5 depicts characteristic power versus voltage (PV) plots for solar panels with and without diode bypassing exposed to differing amounts of shading. Diode bypassing is a technique whereby individual cells or groups of cells within a solar panel include standard diodes in parallel to provide a path for current when a particular cell or group of cells is not producing current due to being shaded from the sun.

Plot 500 shows the PV characteristics for a typical diode bypassed solar array with varying numbers of shaded cells. Plot 550 shows the PV characteristics for a typical non-bypassed solar array with varying numbers of shaded cells. The individual plots are enumerated as follows:

505—Diode bypassed solar array with no shaded cells.
510—Diode bypassed solar array with one shaded cell.
515—Diode bypassed solar array with two shaded cells.
520—Diode bypassed solar array with three shaded cells.
525—Diode bypassed solar array with four shaded cells.
530—Diode bypassed solar array with five shaded cells.
535—Diode bypassed solar array with six shaded cells.
540—Diode bypassed solar array with seven shaded cells.
555—Non-diode bypassed solar array with no shaded cells.
560—Non-diode bypassed solar array with one shaded cell.
565—Non-diode bypassed solar array with two shaded cells.

In simple solar powered systems with battery charging, the solar panel is sized such that at its maximum power point, its output voltage is slightly higher than the desired voltage to charge the battery. The battery will cause the solar panel to operate at a power point slightly below its maximum power point and the system will not extract the maximum power from the solar panel. Adding a buck DC/DC converter allows the solar panel to be operated at maximum power point regardless of the battery voltage. But, when solar array cells are shaded, the maximum power point may drop to a voltage below that of the battery and therefore, the buck converter will no longer be able to extract maximum power. For instance, the buck converter may extract maximum power from the solar array when the solar array is operating at its maximum power point with no shaded cells (point 502 or 557 on plots 500 and 550). But, a buck converter may not be able to extract maximum power when the solar array is operating with shaded cells (for example point 503 or 562 on plots 500 and 550). The DC/DC converter 201 with its ability to buck, boost or buck/boost allows the EMS 110 to extract maximum power when some of the cells of solar panel 120 are shaded.

Time

In some applications, it may be desirable for the processor 200 to have an awareness of time of day. Such an application may for example be when the load 235 or portions thereof are to be operated at certain times of the day. This may include applications where there are more than one solar powered system within sight of one another. In such a situation, it may be desirable for certain actions such as the activation or extinguishing of the load 140 to happen at the same time. Since the solar power system 100 may be operated in a location where access to communications architecture to retrieve the time of day may be unavailable or impractical, an alternate method of determining time of day is desirable.

It can be shown that:

$$MN = (N-k1)*k2 \text{ where:}$$

MN is the number of minutes from sundown to midnight,
N is the length of the night in minutes,
k1 and k2 are best fit constants derived from historical sunset and sunrise times for the location where the solar power system 100 is to be installed.

Alternatively, the processor 200 may determine the time of day by measuring the time of sunset and sunrise and assuming that a particular time of day falls half way between these two times. The particular time of day may be 12:30 am for a location subject to daylight savings time in order that over the entire year, the error in the estimated time of day is minimized. The particular time of day may be 12:00 am for a location not subject to daylight savings time. The particular time of day may also be adjusted depending on the latitude of the solar power system 100 within the time zone.

Figure 6:
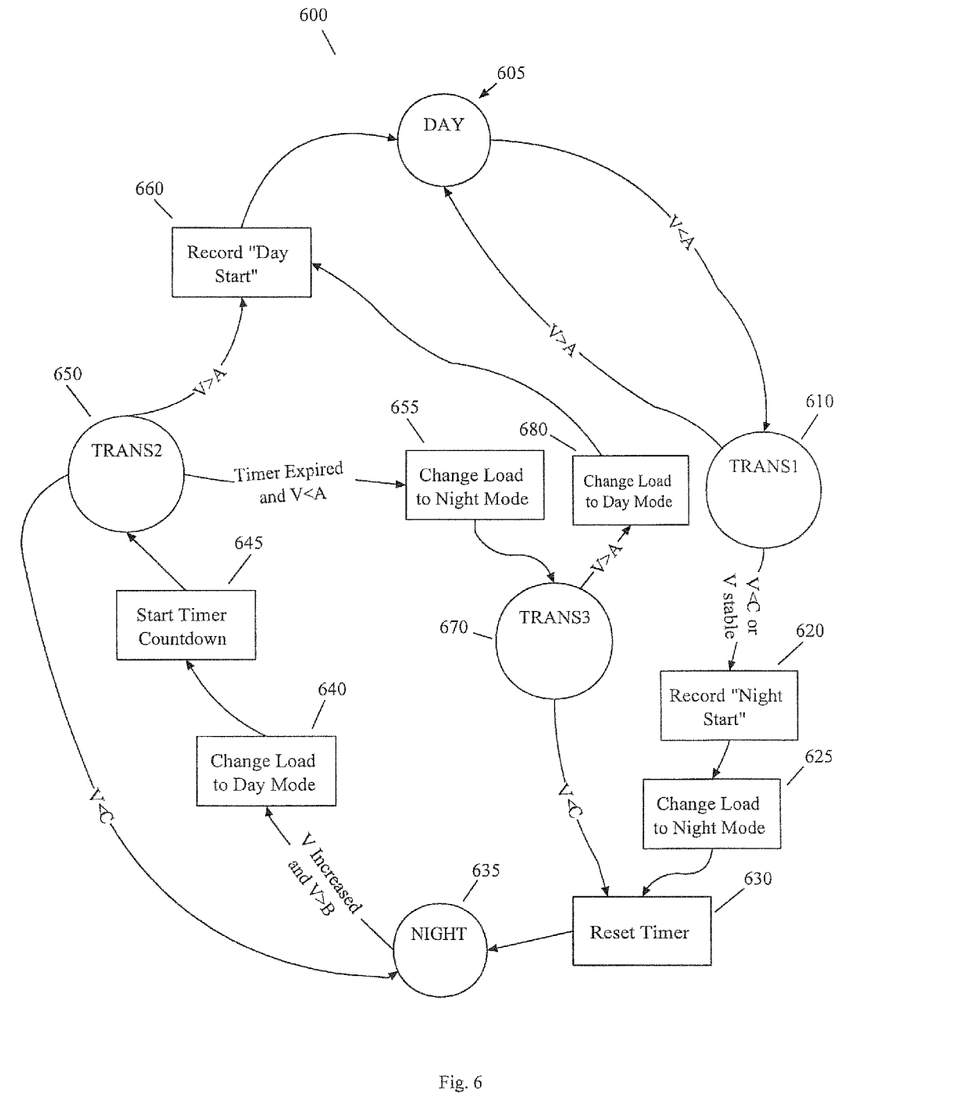
FIG. 6 is a flow diagram depicting a portion of the operation of said processor for the assessment of the approximate time of day.

Referring now to FIG. 2 and FIG. 6 the processor 200 may determine the approximate time of day. The processor 200 open circuits the solar panel 120 in order to make an open circuit voltage measurement of the solar panel. The processor then reads the open circuit voltage using an A/D input through conditioning circuitry 210. This open circuit voltage measurement is then used in the day/night determination procedure 600. In the following discussion, it will be appreciated that as an alternate to the open circuit voltage, the short circuit current of the solar panel 120 may also be used as an indication of irradiance.

Starting in the state "day" 605, the processor 200 determines when the open circuit voltage falls below a first threshold "A". It then enters the state "trans1" 610. When in state "trans1", if the open circuit voltage rises above threshold "A", the processor 200 transitions back to state "day" 605. When in state "trans1" 610, if the open circuit voltage is stable or less than a second threshold "C", the processor 200 records the present time as the start of night 620, changes the load 235 to night mode 625 and resets a timer for detection of night end 630. The processor then enters state "night" 635. A stable open circuit voltage may be determined by the processor 200 calculating that the rate of change of the open circuit voltage is below a particular threshold.

While in state "night" 635 if the processor detects that the open circuit voltage is increasing and is greater than a third threshold "B", it changes the load 235 to day mode 640 and starts a countdown timer 645. The processor then enters state "trans2" 650. While in this state, if the open circuit voltage rises above the first threshold "A", the processor 200 records the present time as the start of day 660 and enters state "day" 605. While in state "trans2" 650 if the timer expires and the open circuit voltage is still less than the first threshold "A", the processor changes the load to night mode and enters state "trans3" 670. While in state "trans3" if the open circuit voltage rises above threshold "A", the processor changes the load to day mode 680 and follows the path through block 660.

Otherwise, if the open circuit voltage falls below the third threshold "C", the processor follows the path through block 630. This may be due to ambient light causing the solar panel voltage to increase rather than a true dawn.

In the preceeding description, for an example 12V solar panel, the thresholds may be as follows:

"A"—11V
"B"—6V
"C"—4.5V

It will be appreciated that these thresholds may be dynamically or manually adjusted for a given installation location, solar panel 120 type, etc. For example, a given installation may have a higher ambient light level than another. The processor 200 may thus adjust the thresholds after observation of one or more nights using for example average open circuit solar panel 120 voltage.

As alternatives or adjustments to the preceeding discussion, other techniques may be used to determine the beginning of day or night. For example, to distinguish between the true start of day and an ambient light such as a street light turning on, the rate of change of the open circuit voltage of solar panel 120 may be used. The rate of change of open circuit voltage may be much larger when a street light turns on than the rate of change of open circuit voltage for true dawn.

In the proceeding description, a load in night mode may be for example an LED at reduced brightness over day mode in a crosswalk, schoolzone or 24 hour roadway flasher application to save power due to the fact that less light is needed during the night for equivalent perception by a driver. In a transit shelter, night mode may be the mode where an LED is illuminated, there being no need to illuminate the shelter during the day.

Figure 7:
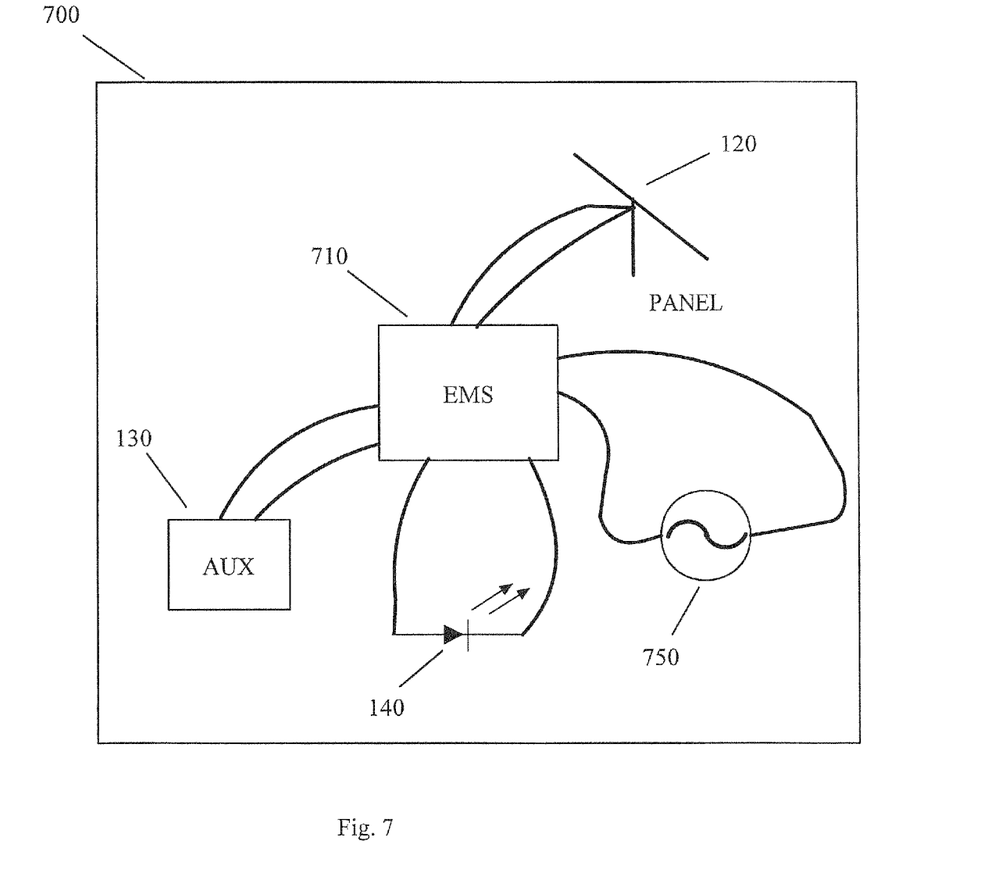
FIG. 7 is a diagram of an alternate system of an example of the invention.

FIG. 7 depicts an alternate solar powered system 700. This alternate solar powered system 700 comprises an alternate EMS 710 which is capable of similar functions as the EMS 110, but applies and extracts energy from an electrical grid 750 instead of a battery 150. Applying and extracting energy from the electrical grid 750 allows excess energy available from the solar panel 120 to be fed to the electrical grid 750 (for instance during the summer). It also allows for extraction of energy from the electrical grid 750 during times when adequate solar energy is not available from the solar panel 120 (for instance during the winter and/or during the night). In this alternate solar powered system 700, the EMS may comprise an energy meter to measure the amount of energy received from and delivered to the electrical grid 750. The output of this energy meter may be used to bill for the energy used and/or generated.

It will be appreciated by those skilled in the art that the preferred and alternative embodiments have been described in some detail but that certain modifications may be practiced without departing from the principles of the invention.

What is claimed is:

1. An apparatus for powering a load from solar energy comprising:
   a DC/DC converter;
   battery terminals coupled to said DC/DC converter and coupleable to a battery;
   solar panel terminals coupled to said DC/DC converter and coupleable to a solar panel;
   first logic for controlling a conversion rate of said converter to operate said DC/DC converter near the maximum power point of said solar panel;
   a detector for detecting an energy output of said converter;
   second logic coupled with said detector and operable to adjust the energy consumption of said load over a period of time as a function of the energy available from said solar panel over a previous instance of said period of time.

2. The apparatus of claim 1, wherein said second logic is operable to adjust the energy consumption of said load to be at most 90% of the energy available from said solar panel over said previous instance of said period of time.

3. The apparatus of claim 1 wherein:
   said load comprises at least one light emitting diode; and
   said logic is further adapted to control the brightness of said light emitting diode to adjust the energy consumption of said load.

4. The apparatus of claim 1 wherein:
   said load comprises at least one light emitting diode; and
   said logic is further adapted to control a pulse rate of said light emitting diode to adjust the energy consumption of said load.

5. The apparatus of claim 1 wherein said DC/DC converter comprises a buck converter.

6. The apparatus of claim 1 wherein said DC/DC converter comprises a boost converter.

7. The apparatus of claim 1 wherein said DC/DC converter comprises a buck/boost converter.

8. The apparatus of claim 1 wherein said DC/DC converter comprises an H-bridge.

* * * * *